United States Patent [19]
McCutcheon et al.

[11] Patent Number: 6,161,007
[45] Date of Patent: Dec. 12, 2000

[54] METHOD AND APPARATUS FOR PROCESSING MULTIPLE TYPES OF INCOMING COMMUNICATION

[75] Inventors: Lisa A. McCutcheon, Garland; Fereidon Homayoun, Plano; Raffi J. Gostanian, McKinney, all of Tex.

[73] Assignee: Nortel Networks Limited, Montreal, Canada

[21] Appl. No.: 08/939,275

[22] Filed: Sep. 29, 1997

[51] Int. Cl.$^7$ ................................................. H04B 1/38
[52] U.S. Cl. .................. 455/412; 455/558; 455/563; 455/575
[58] Field of Search .................... 455/412, 413, 455/414, 466, 550, 552, 553, 556, 557, 575, 566, 558, 563

[56] References Cited

U.S. PATENT DOCUMENTS

| | | | |
|---|---|---|---|
| 5,592,532 | 1/1997 | Koizumi | 455/412 |
| 5,870,679 | 2/1999 | Ezumi | 455/557 |
| 5,966,652 | 10/1999 | Coad et al. | 455/557 |

*Primary Examiner*—Thanh Cong Le
*Attorney, Agent, or Firm*—John D. Crane

[57] ABSTRACT

An apparatus which is capable of facilitating wireless and wireline communication with a multitude of wireless and wireline devices. The apparatus includes the necessary functionality to receive, record, process, and output incoming wireless and/or wireline voice, text, data, and multi-media messages. These messages can be outputted instantly or later to voice and/or to paper, based on a users input and preference. The user has many commands and options from which to choose when processing the messages. These choices will provide the user with more flexibility in determining how and when incoming communications can and should be processed.

2 Claims, 5 Drawing Sheets

METHOD AND APPARATUS FOR PROCESSING MULTIPLE TYPES OF INCOMING COMMUNICATION

TECHNICAL FIELD OF THE INVENTION

This invention relates generally to telecommunications and more particularly to a method and apparatus for processing multiple types of incoming wireless, wireline, fixed-wireless, satellite, and hybrid communications. Further, this invention relates to a method and apparatus of an enhanced answering machine.

BACKGROUND OF THE INVENTION

A traditional answering machine serves the important function of being able to record a voice message that can be played back and listened to at a later time. This type of answering machine has been very popular and enjoys a ubiquitous presence in most homes and businesses.

The traditional answering machine, however, is limited in its ability to output a received message in a different medium other than voice. The user has no other option to receive a message in a different medium such as text. Additionally, a user must be present at the answering machine (or another phone accessing the answering machine) in order to retrieve the message. This ties up the users communication equipment and may hinder other types of incoming and outgoing communications. There is also a capacity cost that is incurred within the answering machine and telecommunications network because messages must be stored in the answering machine which depletes available memory and then must be retrieved utilizing phone lines or air spectrum. These capacity costs diminish the potential for other types of communications to occur. Lastly, the user must engage the answering machine to initiate the process of retrieving the message.

Therefore, what is needed is a device that can work in conjunction with various communication devices that will provide the user with various options in which to receive messages over various mediums in a format specified by the user without the user having to engage the device.

SUMMARY OF THE INVENTION

The apparatus of the present invention, accordingly, includes the necessary functionality to receive, process, and output incoming wireless and/or wireline voice, text, data, or multi-media messages that can be outputted instantly or later to voice and/or to paper, based on the users input and preference. These choices will provide the user with more flexibility in determining how and when incoming communications should be processed.

DETAILED DESCRIPTION OF THE PREFERRED EMBODIMENT

Figure 1:
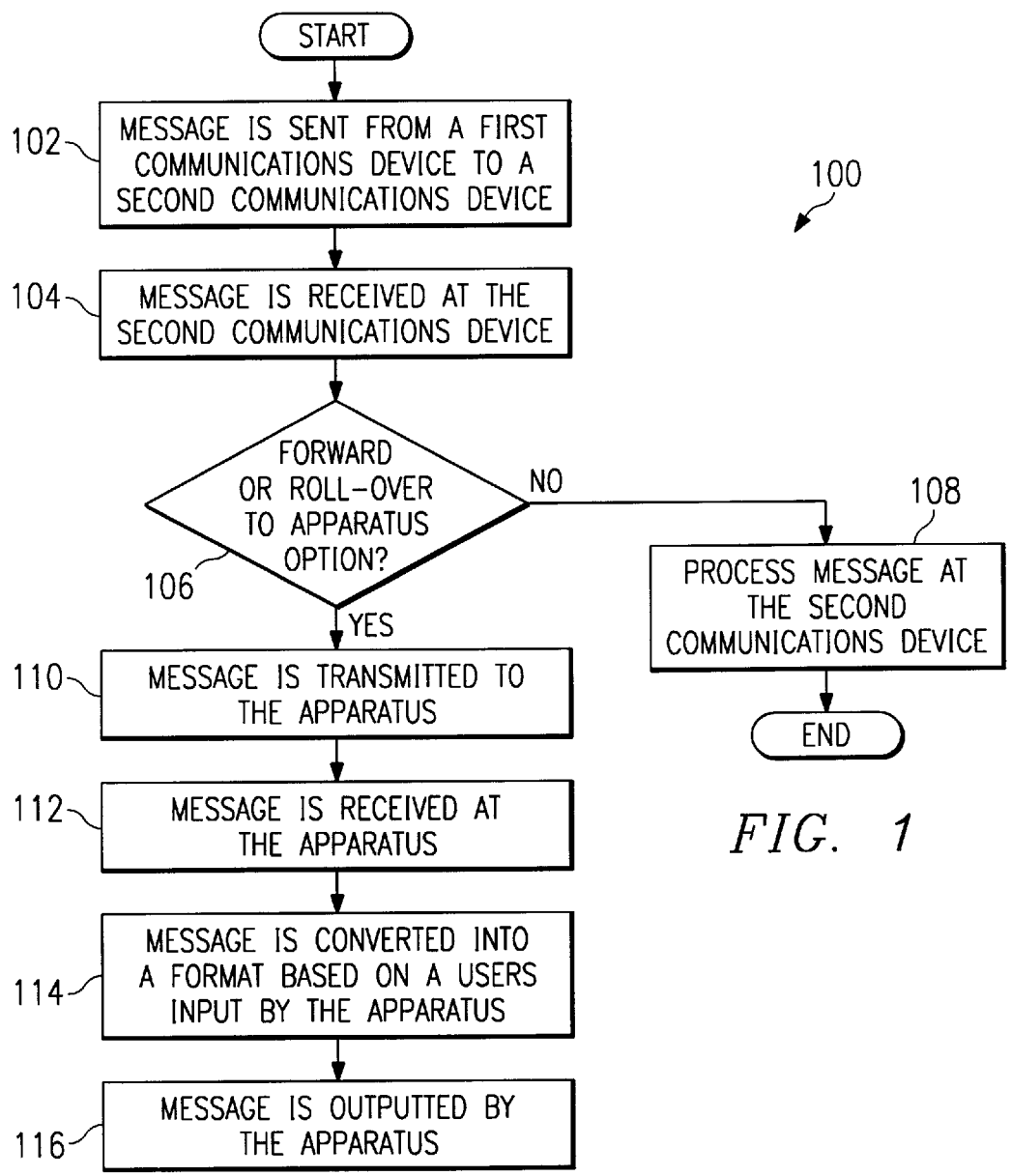
FIG. 1 is a flow diagram that illustrates the transferring of an incoming message to the apparatus of the present invention.

Referring to FIG. 1, the transferring of an incoming message to the apparatus of the present invention is referred to, in general, by the reference numeral 100. In step 102, a message is initially sent from a first communications device to a second communications device. The message sent from the first communications device to the second communications device can be a data, text, or multi-media message. The first communications device, second communications device and apparatus will be described in greater detail herein. In step 104, the message is received at the second communications device where the message is either forwarded or "rolled-over" to the apparatus as shown in steps 106 and 110, or the message is processed at the second communications device as shown in steps 106 and 108. If the option to forward or "roll-over" the message to the apparatus is chosen, the message will be transmitted to and received at the apparatus as shown in steps 110 and 112 respectively. As shown in steps 114 and 116, the message is then converted into a format based on a users input before it is output by the apparatus. The act of processing information in this invention, relates to the apparatus acting on a message in a manner specified by a users input. For example, if the users wishes to print all messages, inputting this desired action will cause the apparatus to print all messages. The method for user input, choices for input, processing means, conversion means, and format choices will be described in greater detail herein.

Figure 2:
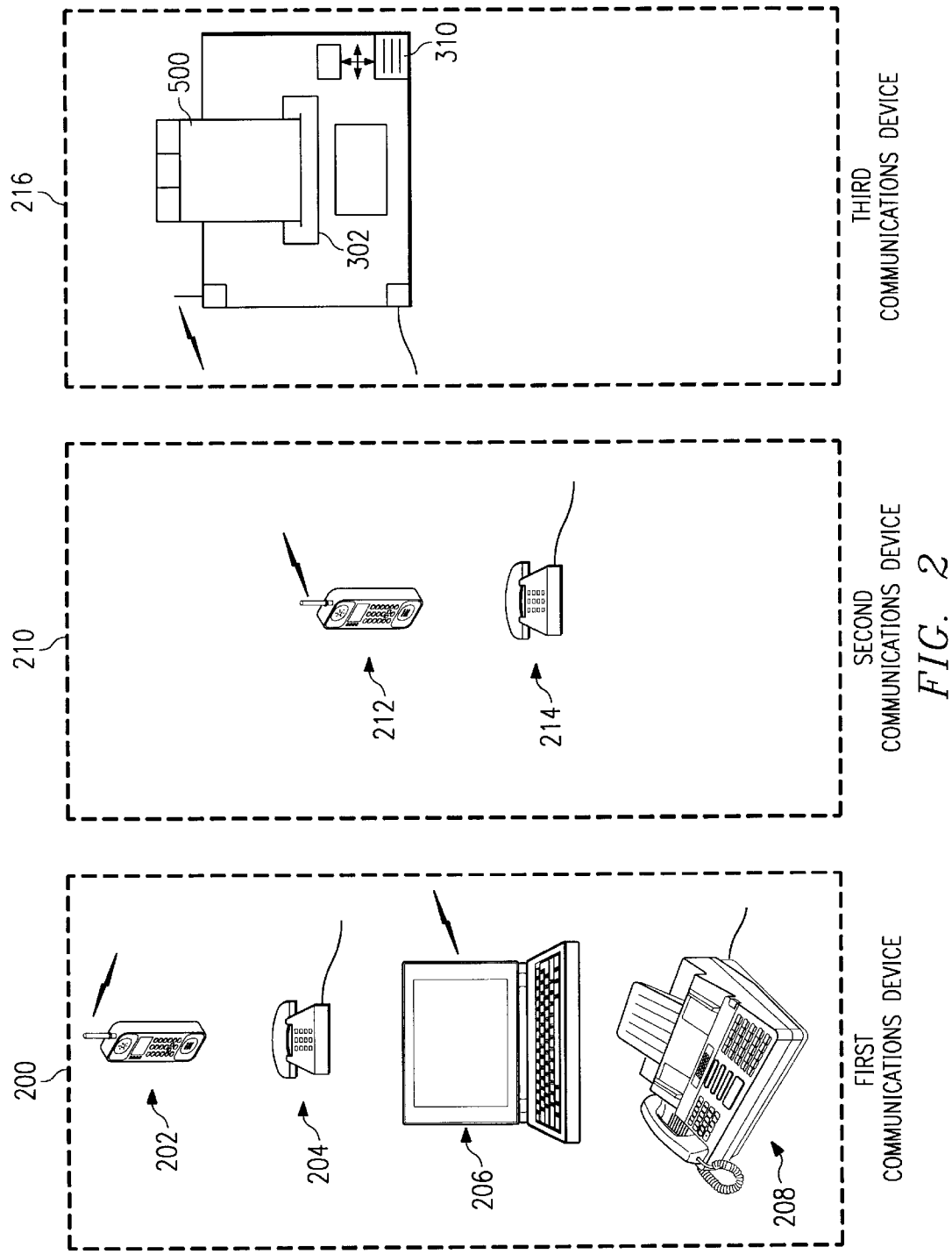
FIG. 2 is an isometric view of the apparatus of the present invention.

Referring to FIG. 2, the apparatus of the present invention is referred to, in general, by the reference numeral 216. Apparatus 216, which is also referred to as a Third Communications Device 216, works in conjunction with a plurality of Second Communications Devices 210. These devices 210 may include one or more wireless terminal ((phone, pager, Personal Digital Assistant (PDA), computer, etc.)) 212, or wireline terminal 214. A Second Communications Device 210 initially receives a message from a First Communications Device 200. These devices 200 similarly may include one or more wireless terminal 202, wireline terminal 204, and may additionally include one or more computer 206, or facsimile machine 208.

When a user of a First Communications Device 200 initiates a communication to a user of a Second Communications Device 210, the user of the Second Communications Device 210 can either choose to immediately receive the incoming communications or have the incoming communications forwarded to the apparatus 216. If the user of the Second Communications Device 210 wishes to receive the incoming information as soon as it is transmitted, he or she may do so by ensuring the Second Communications Device 210 is not forwarded to the apparatus 216. If, however, the user wishes to have the information forwarded to the apparatus 216, he or she may either forward the information from the Second Communications Device 210 to the apparatus 216, or just not answer the incoming communications and have the incoming communications "roll-over" to the apparatus 216 after a predetermined number of "rings" at the Second Communications Device 210. The steps required to forward information or have incoming communications "roll-over" to an apparatus are well known to those with skill in the data processing art and, therefore, will not be described in greater detail herein.

Apparatus 216 works in conjunction with at least one Second Communications Device 210 and is able to receive information from the Second Communications Device 210. When the information is received, it can be immediately outputted to paper 500 via a printer 416 through an open slot 302 of the apparatus 216. The information can also be stored in memory and outputted at a latter time either to paper 500 (via the printer 416) or, voice (via a transceiver 310). The paper, printer, open slot, and transceiver will be described in greater detail herein. The apparatus 216 can also be operably coupled to more than one wireless terminal 212 or wireline terminal 214.

The information that can be received and output to paper or voice by the apparatus 216 includes voice, text, data, or multi-media. In one example, text or data may be sent from any First Communications Device 200 to the wireless terminal 212 or wireline terminal 214 of the Second Communications Device 210. This can occur via a wireless data protocol ((Cellular Digital Packet Data (CDPD), Short Message Service (SMS), etc.)) for the wireless terminal 202, via email and internet for the wireline terminal 204 and computer 206, and via Group 3, Fax for the facsimile machine 208. In another example, voice may be sent from at least one First Communications Device 200 to the wireless terminal 212 or wireline terminal 214 of the Second Communications Device 210. This can occur via a wireless air protocol ((including Advanced Mobile Phone Service (AMPS), Time Division Multiple Access (TDMA), Code Division Multiple Access (CDMA), Global System for Mobile Communications (GSM), etc.)) for the wireless terminal 202 or via a wireline protocol ((Primary Rate Interface (PRI), Basic Rate Interface (BRI), Integrated Services Digital Network (ISDN), Signaling System 7 (SS7), etc.)) for the wireline terminal 204.

In yet another example, multi-media information can be sent from any First Communications Device 200 to the wireless terminal 212 or wireline terminal 214 of the Second Communications Device 210 if the devices sending and receiving information were internet or web compliant devices. Thus, when the apparatus 216 receives this voice, data, text, or multi-media information, it can output it to either paper or voice. In this scenario, the apparatus is acting as an enhanced answering machine.

Figure 3:
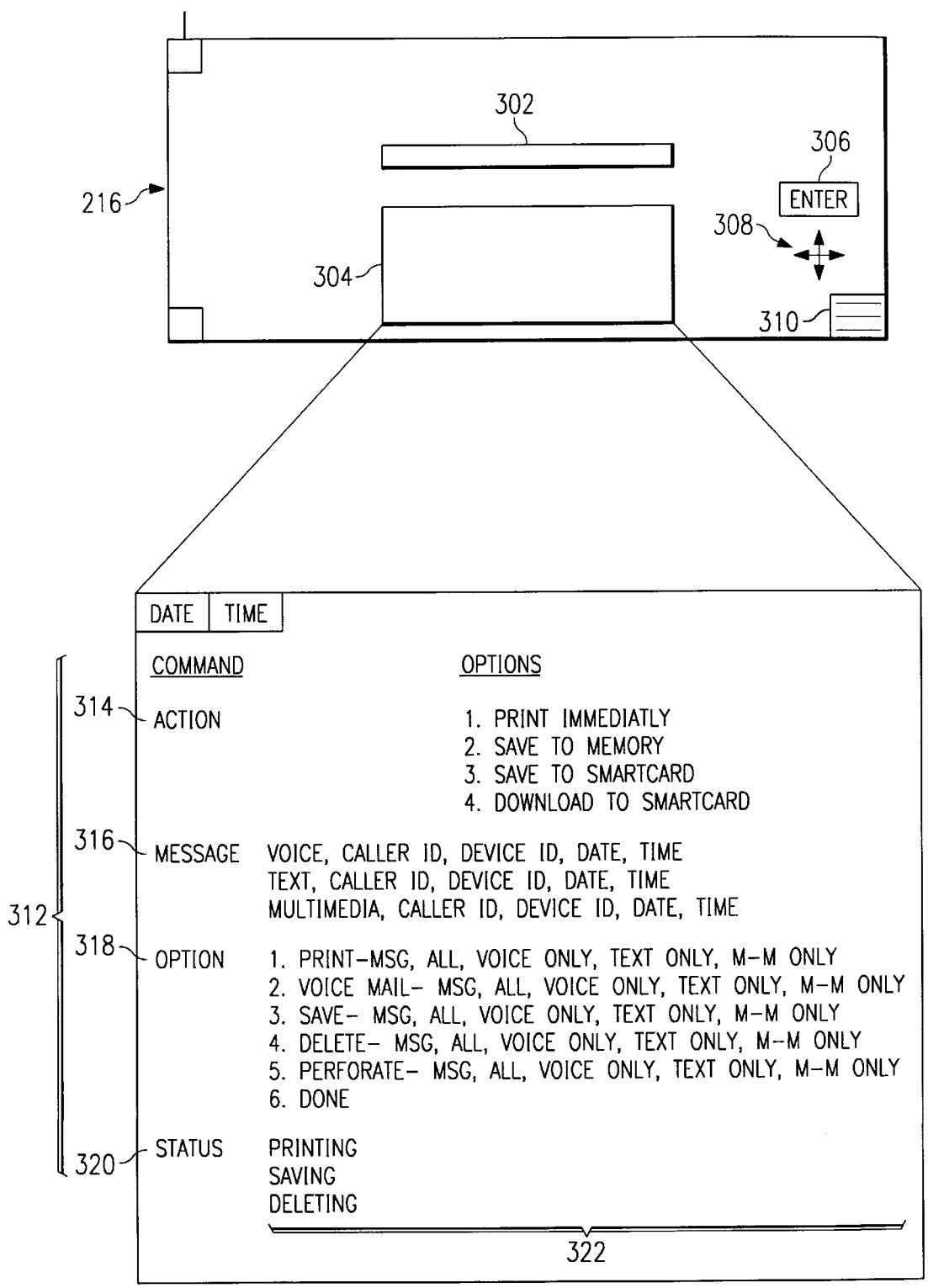
FIG. 3 illustrates the commands and options available to the user to process messages that are received at the apparatus in FIG. 1.

Referring to FIG. 3, the user can control the type and order of messages to be output by navigating through various commands 312 and options 322 that are displayed on the screen 304 via the arrow keys 308 and the enter key 306. The arrow keys 308 are a device utilized to move a cursor and highlight different choices on the screen 304. The user would pick the available choices by using the up and down arrow keys 308 to navigate through the commands 312 and the left and right arrow keys 308 to navigate through the options 322. When a highlighted command 312 or option 322 is wanted, the user simply presses the enter key 306 to activate that command or option. In addition to the various commands 312 and options 322 that are displayed on the screen 304, the current date and time are also shown.

Additional forms and examples of processing now follows. There are four available commands 312 including: action 314, message 316, option 318, and status 320. The action command 314 has four associated options 322 including: print immediately, save to memory, save to smart card, and download from smart card. The message command 316 has three associated options 322 including: the voice message and header information, the text message and header information, and the multi-media message and the header information. The header information contains the caller I.D., device I.D., date of delivery of the message, and time of delivery of the message. The option command 318 has six associated options including the options to print, play voice mail, save, delete, and perforate a particular message, all messages, voice messages only, text messages only, or multi-media messages only. The last option available is the done option which indicates the user has concluded inputting his or her options. Finally, the status command 320 has three associated options including printing, saving, and deleting.

Additionally, the user can choose more than one command 312 or option 322 to be activated. For example, if the user wanted to immediately print all incoming communications to paper, the print immediately option under the action command 314, the print all option under the options command 318, and the done option under the options command 318 would be chosen.

Figure 4:
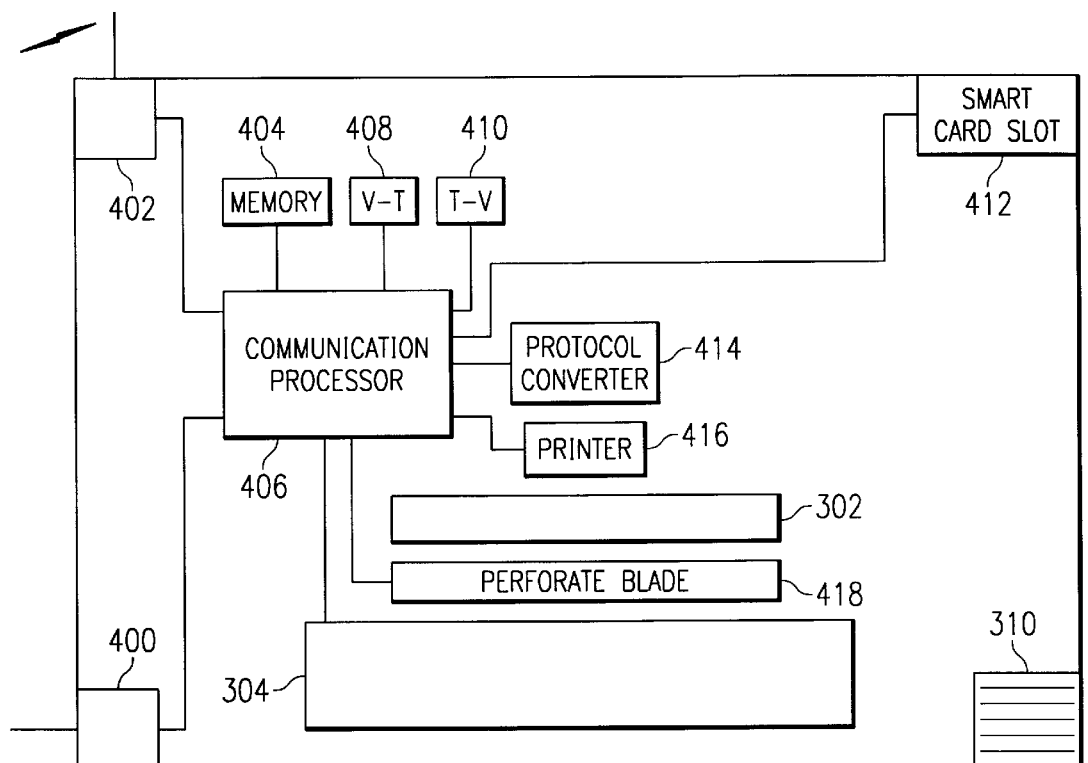
FIG. 4 is a block diagram of the apparatus in FIG. 1 and FIG. 2.

Referring to FIG. 4, the apparatus 216 is able to receive information from a Second Communications Device 210 (not shown) either via a wireline communications interface 400 which can be accessed via an RS-232 cable, or similar device suitable for receiving communications over a wire or group of wires, or a via wireless communications interface 402 which can be accessed by a number of air protocols. The wireless communication interface 402 is a smart antenna that is able to accept different wireless protocols over different frequencies. These interfaces 400 and 402 can support many types of incoming messages including voice, text, facsimile, data, or multi-media.

Incoming information is sent from the communication interfaces 400 and 402 to the communication processor 406. The communication processor 406, which is operably coupled to the communication interfaces 400 and 402, receives the incoming information and checks the message for header information. This header information includes the caller I.D. (which includes the callers name and number), time of the transmission, date of the transmission, and the identity of the device originating the transmission. The communication processor 406 is also operably coupled to printer 416 and memory 404, allowing the communication processor 406 to output a received message. If a user chooses, the header information and content of the message can be directly printed on paper when received at the communication processor 406 via the printer 416, the paper being expelled through the open slot 302. Alternatively, the message can be first stored in memory 404 before being outputted at some later time. In this situation, the header information and content of the message can be retrieved from memory 404 by the communication processor 406 and either outputted to voice via the transceiver 310, printed on paper via the printer 416, or both.

The apparatus 216 also contains a voice-to-text converter 408, a text-to-voice converter 410, a protocol converter 414, a smart card slot 412, and a perforation blade 418 which are all operably coupled to the communication processor 406.

Through the voice-to-text converter 408 and the text-to-voice converter 410, the user has the option of converting received messages to text, voice, or both. If the apparatus 216 received a voice message and the user indicated all messages were to be printed to paper, the voice message would be routed to the voice-to-text converter 408 by the communication processor 406. The voice-to-text converter 408 would convert the voice message into a text message and send that text message back to the communication processor 406. The communication processor 406 would then send the text message to the printer to be printed out. The text-to-voice converter 410 would work in a similar manner except a text message would be converted into a voice message and output via the transceiver 310. The user is now able to receive all of their messages in the form they prefer.

If the communication processor 406 receives an incoming wireless message that is submitted over a different protocol than the communication processor 406 can understand or process, it is sent to the protocol converter 414. The protocol converter 414 takes incoming messages and converts them into a format that can be understood and processed by the communication processor 406. For example, if the wireless communication interface 402 were designed to receive CDMA protocol messages and a GSM wireless message is received by the wireless communication interface 402, the GSM message is forwarded to the communication processor 406. The communication processor 406 would not understand the GSM message and would forward it to the protocol converter 414. The protocol converter 414 would then take the relevant information from the fields of the GSM message and put them into appropriate fields of a CDMA message. There will not be a perfect mapping of messages from one wireless protocol to another based on the inherent differences with message length and content. Vital information, however, which is common to all messages, will be converted into the appropriate message format and sent back to the communication processor 406 for processing.

A smart card slot 412, which is able to receive a smart card (not shown), is also operably coupled to the communication processor 406. The smart card can download or upload text, data, voice or multi-media messages. A smart card, in this context, is plastic and the size of a credit card but has one or several microprocessors embedded in the plastic substrate and flush with the surface of the card. The microprocessor contains memory, protection and reset circuits, a clock, and an I/O (input/output) area, and acts as a contact that allows the transfer of information to and from the card. The smart card also has several kilobits of permanent (rewritable or nonrewritable) memory that can store information. The smart card slot 412 includes a contact that is able to send and retrieve information to and from the smart card contact when the smart card is entered into the smart card slot 412. The communication processor 406 handles the flow of information between the apparatus 216 and the smart card based on a users input. For example, the user, via the screen 304, can choose the action command 314 and one of the smart card options. If a user is initially receiving messages on a wireless terminal that is able to house a smart card, these messages, and others that the user may compile, are stored on the smart card. That smart card may then be taken out of the wireless terminal and placed in the smart card slot 412 of the apparatus 216. The various messages on the smart card can then be downloaded to the communication processor 406 by choosing the download from smart card option. The smart card can then be left in the smart card slot 216 while incoming messages are received at the communication processor 406. The smart card can then store these messages with the save to smart card command. The smart card can then be placed in a users wireless device (as can currently be done in GSM phones) and the messages can be outputted through the wireless device at the users convenience.

Figure 5:
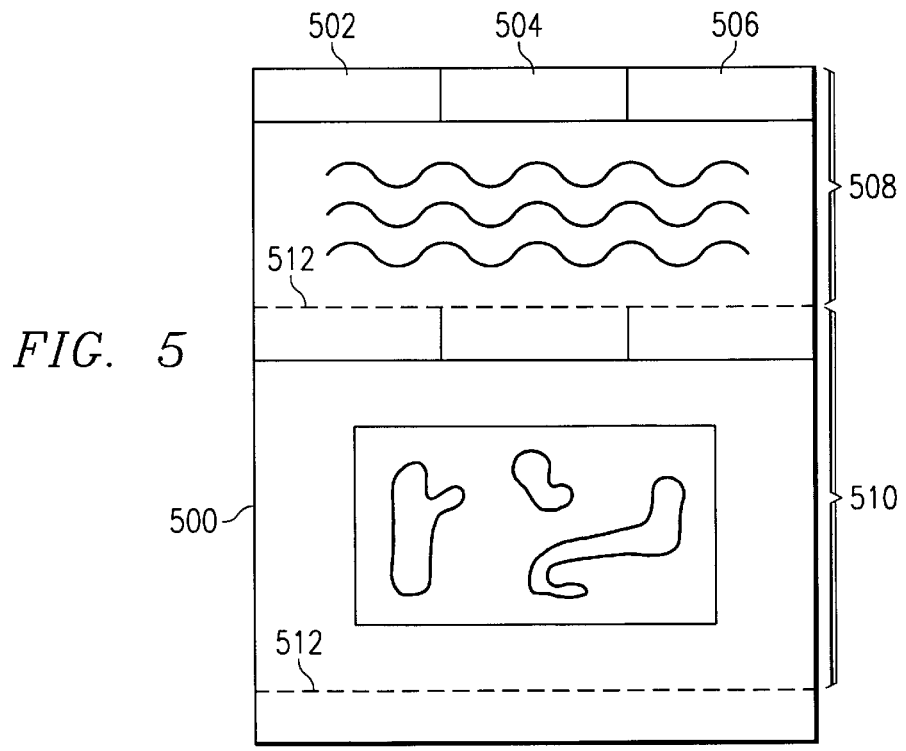
FIG. 5 illustrates the possible formatted paper output of the received messages.

Referring to FIG. 5, when the incoming information is outputted to paper 500, the callers I.D. (name and/or number) is placed in field 502, the time and date of the message transmission to the apparatus 216 is placed in field 504 and the identity of the First Communications Device 200 sending the message to the apparatus 216 is placed in field 506. It can also be seen that when a text message 508 or multi-media message 510 has ended and all of the information for a message has been recorded, a perforation 512 is made before a new message is processed.

A perforation blade 418 (as shown in FIG. 4) is able to perforate the paper 500 after a message has been printed. If the perforate option is chosen (under the options command 318), the communication processor 406 identifies the perforation blade 418 when a message has completed printing. At that time, the perforation blade 418 makes a perforation in the paper. This makes it easier to locate different outputted messages and makes it possible to tear and distribute these messages to various individuals.

Figure 6:
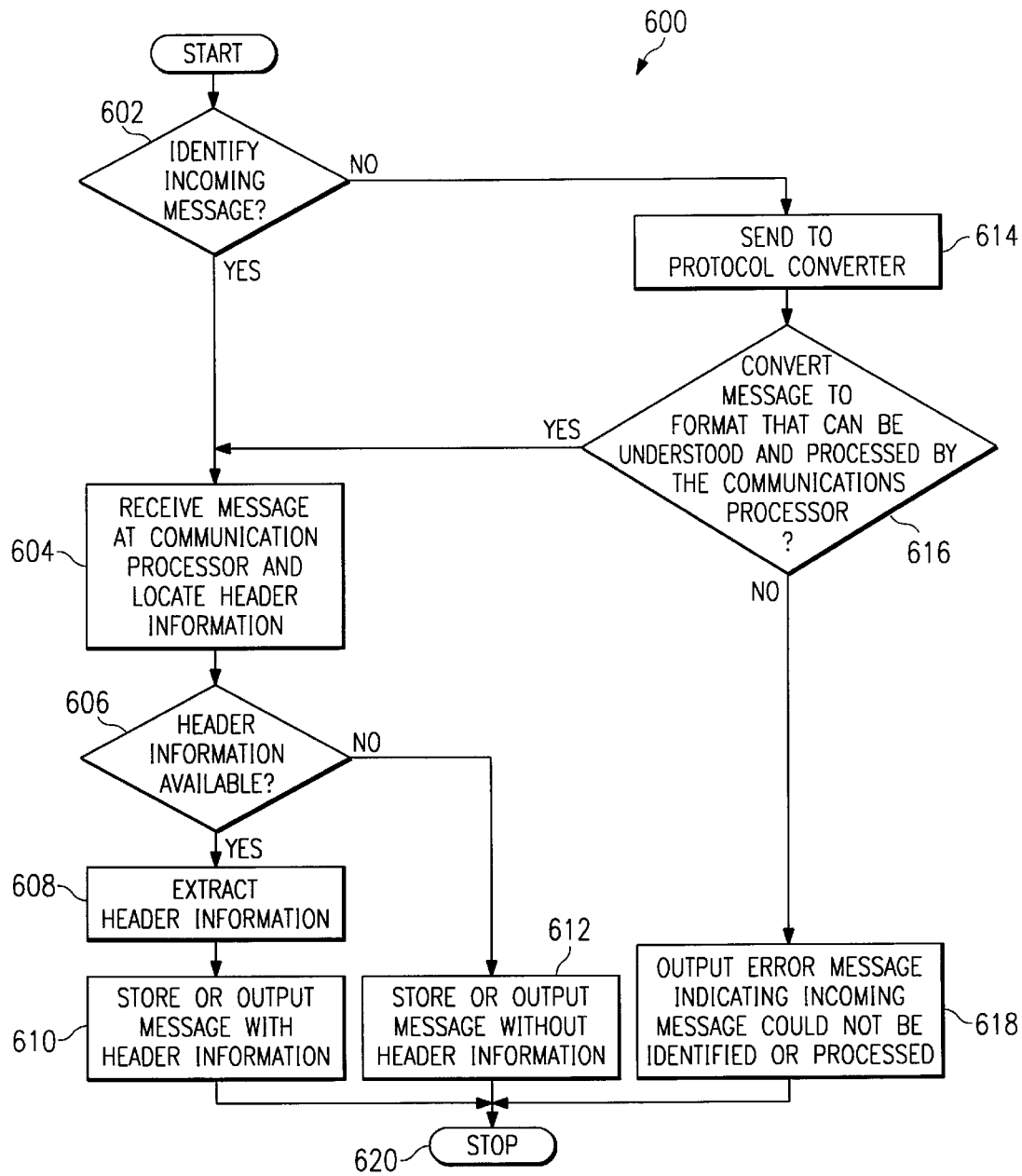
FIG. 6 is a flow diagram that illustrates the handling of an incoming message in accordance with the present invention.

Referring to FIG. 6, a flow diagram 600 illustrates the handling of an incoming message. If the incoming message can be identified 602 by the communication processor 406, it is processed at the communication processor 406 where the header information is searched for 604. If the header information is available 606, it is extracted 608 and then stored or outputted with the message 610. If the header information is not available 606, only the message is stored or outputted 612. If the incoming message cannot be identified 602, the message is sent to the protocol converter 614 where it is converted into a format that can be identified and processed by the communication processor 406. If the incoming message can be converted 616, it is sent to the communications processor 406 where the header information is searched for 604. If the incoming message cannot be converted 616, an error message is stored or outputted that indicates the incoming message could not be identified 618. After any of these three scenarios have occurred, the apparatus will stop processing the incoming message 620 until another incoming message is received.

It is understood that variations may be made in the foregoing without departing from the scope of the invention. For example, the second communications device 210 and the third communications device 216 of FIG. 2 can be integrated into a common communications device that provides the user with the additional ability to make and receive calls with a common device.

In view of the above detailed description and associated drawings, the advantages of this method and apparatus for processing multiple types of incoming wireless and wireline communications should be apparent to those skilled in the art. Additionally, modifications and variations will now become apparent to those skilled in the art such that other modifications and variations may be effected without departing from the spirit and scope of the present invention as set forth in the claims which follow.

What is claimed is:

1. A telecommunication device capable of receiving multiple types of incoming messages comprising, in combination:

a communication interface for receiving incoming messages in the form of voice, text, data or multimedia messages;

a communication processor coupled to the communication interface for receiving and processing each received message;

a memory coupled to the communication processor for storing processed messages;

means for entering a desired action for each type of incoming message including immediate or delayed output thereof and including unchanged or format changed output thereof;

a voice to text converter disposed between the communication processor and the memory to convert incoming voice messages to text when such desired action has been entered;

a text to voice converter disposed between the communication processor and the memory to convert incoming text messages to voice when such desired action has been entered; and a plurality of output devices coupled to the communications processor, the memory and the entering means to output the processed message based on user input wherein the output may be immediate or delayed in time and may be in the same or different format from the message originally received.

2. The telecommunication device of claim 1 additionally including a protocol converter for converting the incoming message from the interface in one of a plurality of communication protocols to a message with a single protocol understandable by the communication processor.

* * * * *